United States Patent [19]
Finley

[11] Patent Number: 5,106,230
[45] Date of Patent: Apr. 21, 1992

[54] METHOD AND APPARATUS FOR INDUCING ARTIFICIAL OCEANOGRAPHIC UPWELLING

[76] Inventor: Warren T. Finley, 564 Vista La., Laguna Beach, Calif. 92651

[21] Appl. No.: 683,476

[22] Filed: Apr. 9, 1991

[51] Int. Cl.⁵ .............................................. E02B 13/00
[52] U.S. Cl. ........................................ 405/52; 119/3; 405/195.1
[58] Field of Search .............. 405/52, 195, 60; 119/3, 119/4

[56] References Cited

U.S. PATENT DOCUMENTS

| | | | |
|---|---|---|---|
| 2,827,268 | 3/1958 | Staaf | 405/52 X |
| 3,585,802 | 6/1971 | Frankel | 405/52 X |
| 4,051,810 | 10/1977 | Breit | 405/52 X |
| 4,116,009 | 9/1978 | Daubin | 405/195 X |
| 4,597,360 | 7/1986 | Johnson | 119/3 |
| 4,657,675 | 4/1987 | Zan | 119/3 X |
| 4,669,914 | 6/1987 | Kortmann | 405/52 |

*Primary Examiner*—Dennis L. Taylor
*Attorney, Agent, or Firm*—Knobbe, Martens, Olson & Bear

[57] ABSTRACT

The disclosed method and apparatus provides for the upwelling of cold nutrient-rich water from a predetermined depth in the ocean. The method employs the conducting of a relatively fresh-water input stream to the predetermined depth, wherein the fresh-water stream is mixed with ambient sea water from the predetermined depth to form a substantially homogeneous mixture. The mixture is then conducted through an up pipe to a lesser depth, the surface, or above the surface. The apparatus includes a mixing chamber fluidly connected to a down pipe and an up pipe at the predetermined depth.

14 Claims, 11 Drawing Sheets

METHOD AND APPARATUS FOR INDUCING ARTIFICIAL OCEANOGRAPHIC UPWELLING

This application is a continuation-in-part of application Ser. No. 507,473, filed Apr. 13, 1990, now abandoned.

BACKGROUND OF THE INVENTION

The present invention relates to a method and apparatus for inducing artificial oceanographic upwelling and, in particular, to conducting a relatively fresh water stream to a predetermined depth so as to form a mixture with ambient sea water, and conducting the mixture from the depth.

Typically, the ocean is comprised of a plurality of discrete layers such that the upper surface layer has a relatively high temperature and salinity, while lower layers, often at depths of 1000 meters or more, have a relatively low temperature and salinity.

The ocean also exhibits a photic zone and an aphotic zone. The photic zone is defined by the depths of the ocean in which photosynthesis is capable of occurring. Typically, the necessary amount of sunlight required to carry on photosynthesis extends only 100 to 200 meters below the surface. As photosynthesis is the initial link in the food chain, the photic zone includes a host of nutrient-depleting life forms. These life forms substantially reduce the available nutrients of the photic zone.

The depth below the photic zone, where insufficient light penetrates to support photosynthesis, is known as the aphotic zone. The lack of nutrient depleting life forms combined with enrichment from the decay of organisms in the aphotic zone results in the deep water being, on the average, substantially richer in nutrients than the upper layers of the ocean. The existence of discrete ocean layers having distinct temperatures, densities, salinities and nutrient contents represents a substantial source of energy.

In an effort to utilize the potential energy stored within the ocean structure, attempts have been made to bring the relatively deep, nutrient-rich cold water towards the surface. The upwelling, or bringing towards the surface, of the cold, nutrient-rich water of the deep ocean provides for a variety of applications, including ocean thermal energy conversion (OTEC) systems and mariculture.

In the OTEC systems, warm surface water is used to vaporize a working fluid. In a closed loop OTEC system, the upwelled cold, deep water is brought to the surface to recondense the vaporized working fluid of the OTEC system. The upwelled water thereby provides the necessary heat sink for operation of the closed loop OTEC system.

In maricultural applications, the nutrient-rich water from the aphotic zone is brought to the photic zone, where phytoplankton utilize the nutrients in a photosynthetic process, thereby further creating the primary food source. The fish of the photic zone feed upon the increased food supply provided by the upwelled water. As the fish remain in the food-rich area of the upwelled water, the harvesting of the feeding fish is an efficient and economical process.

There have been many attempts to provide an economically viable means for generating artificial upwelling in the sea. The patent to Johnson (U.S. Pat. No. 4,597,360) discloses a salinity-driven oceanographic upwelling device designed to provide a continuous exchange of surface water and deep water. However, the Johnson device requires a main duct and a plurality of elongated flow-segregating members supported within the interior space of the main duct. The organization and retention of these ducts requires alignment of an extensive number of components, which increases the cost of the systems.

Breit U.S. Pat. No. 4,051,810 discloses an apparatus for utilizing deep ocean nutrients in which a wave motion pump floating at the surface of the ocean is utilized to pump warm surface waters downwardly through a down pipe which is positioned within a larger up pipe. The warming of the colder water together with a jet pump action created by a small diameter outlet on the bottom of the down pipe cause the nutrient-rich wastes to flow upwardly through the up pipe into the photic zone. In addition, it is briefly mentioned that "Supplemental waters are available from inland reservoirs under a head of pressure to be used directly, or as effluent from processing plants, and introduced by said lift means . . ." to impart vertical momentum of nutrient-rich deep ocean water. Thus, the lift means for the land water is the apparatus illustrated for the ocean water system. Such system is impractical for the inland water situation.

Therefore, a need exists for a relatively simple apparatus and method for inducing artificial upwelling in the ocean. A need also exists for a method of inducing upwelling which does not require an extensive apparatus. A further need exists for a method which creates artificial upwelling while employing currently available technology.

SUMMARY OF THE INVENTION

The method of the present invention provides for the generation of controlled artificial oceanographic upwelling. The method includes conducting a relatively fresh-water input stream to a predetermined depth, where the fresh-water mixes with the nutrient-rich deep-sea water so as to form a mixture. The mixture is then conducted towards the surface. As the disclosed method requires a minimum of moving components and does not require the use of advanced technology, the method provides an inexpensive and readily applicable system.

In its simplest form, the invention utilizes a down pipe with its inlet connected to a land source of relatively fresh-water with its outlet at a predetermined depth in the ocean. An up pipe is positioned generally vertically in the ocean with its lower, open, inlet and being in communication with the water stream out the lower end of the down pipe and with the adjacent ocean water, while the upper end of the up pipe is remote from the down pipe. The open end of the up pipe may be positioned over the outlet stream from the end of the down pipe, or the down pipe may open into the side wall of the up pipe. The open lower end of the down pipe is preferably not restricted in size, so that the resistance to flow is minimized.

The apparatus in most forms of the invention illustrated also includes a separate structure forming a mixing chamber with the down pipe and the up pipe connected to the mixing chamber. The chamber also includes an influx port which provides a flow path from the surrounding ambient sea to the interior of the mixing chamber.

In OTEC system applications, the input stream is exposed to heat exchangers associated with the down pipe so as to lower the input stream temperature to approach the ambient sea temperature. As the input stream entering the mixing chamber has substantially the same temperature of the ambient water at the predetermined depth, the upwelled mixture exhibits substantially the same temperature as the ambient water at the predetermined depth. Therefore, in the OTEC system applications, the mixing chamber is submerged to a predetermined depth which exhibits a sufficiently low water temperature. The upwelled mixture may be brought proximal to or above the surface of the ocean, as dictated by design considerations.

In maricultural applications, the mixing chamber is located at a predetermined depth which exhibits a relatively high nutrient content. The up pipe in the maricultural application then terminates in the photic zone so as to provide a nutrient-rich input for supporting schools of fish.

DETAILED DESCRIPTION OF THE INVENTION

As employed herein, the terms "ocean" and "sea" are used interchangeably, and are taken to represent the bodies of salt water which cover the surface of the earth. Also, as discussed infra, the variety of geographic and oceanographic conditions precludes an absolute quantitative measurement of the terms "deep," "fresh," "warm" or "cold." Therefore, these terms are used in the comparative sense. The term "ambient" is used to describe the surrounding sea water at a given depth.

Figure 1:
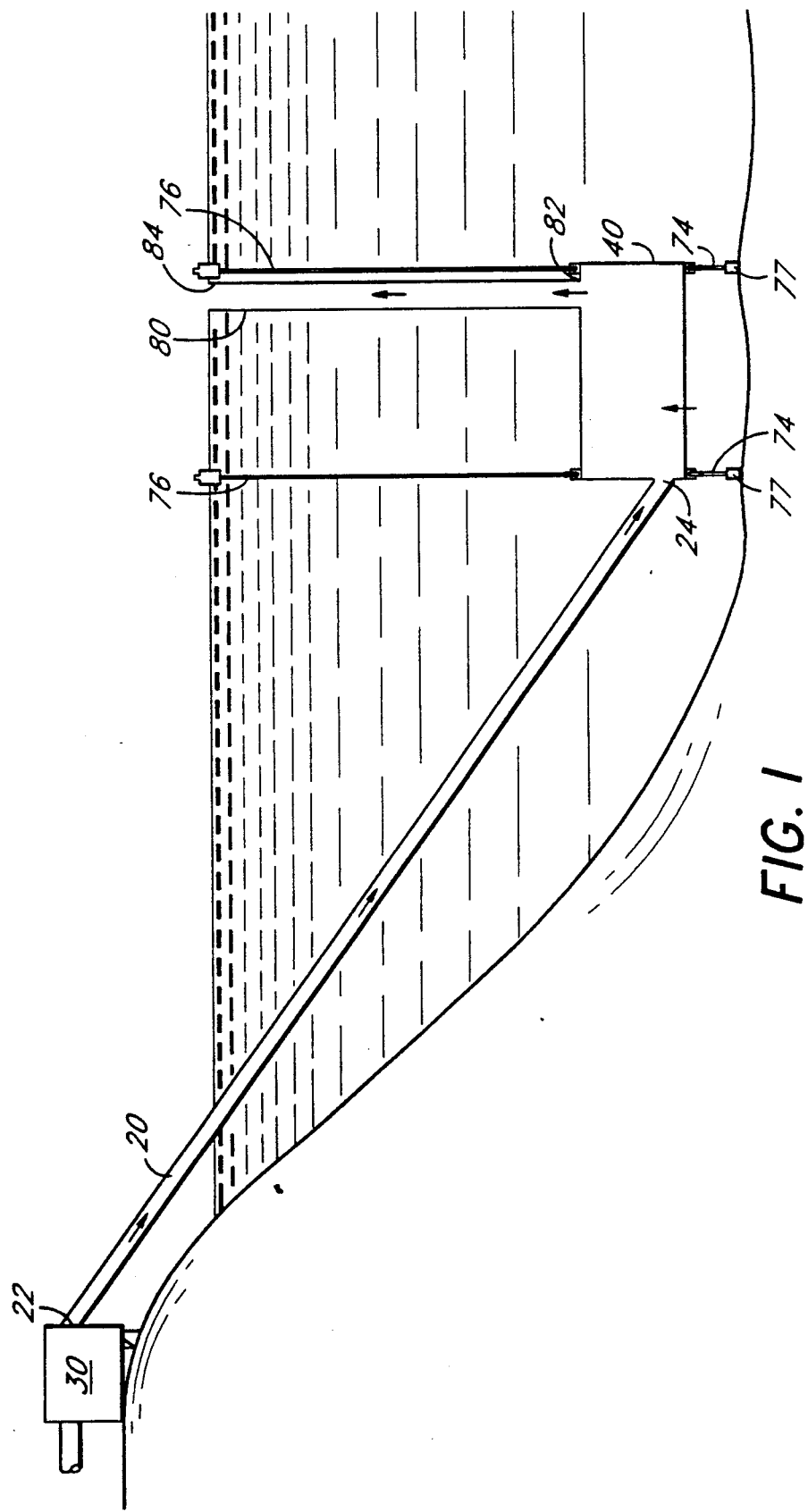
FIG. 1 is a schematic representation showing an operating environment of the present invention.

Referring to FIG. 1, the apparatus employed in connection with the disclosed method includes a down pipe 20, a mixing chamber 40, and an up pipe 80.

Down Pipe

As shown in FIG. 1, the down pipe 20 includes an inlet end 22 and an outlet end 24. The down pipe 20 extends from the inlet end 22 at, or above, surface of the sea to the outlet end 24 at a predetermined depth. The inlet end 22 is connected to a supply of relatively fresh water. The outlet end 24 is connected to the mixing chamber 40. Preferably, the down pipe 20 directly intersects the mixing chamber 40 so as to minimize changes in flow direction and thereby minimize the resistance to flow. That is, the connection of the down pipe 20 to the mixing chamber 40 does not include an elbow. Although the diameter of the down pipe 20 may be any of a variety of diameters, the preferred diameter is a diameter which minimizes the resistance to fluid flow through the pipe, thereby lowering the operating pressure of the system. Resistance to flow through a pipe decreases as the diameter increases; therefore, the larger pipe diameters offer a lower resistance than the smaller pipe diameters. Alternatively, or in cooperation with relatively large diameter pipes, the flow rate through the pipe 20 may be reduced. As the resistance to the flow through the pipe 20 increases as the flow rate increases, a lower flow rate through the pipe lowers the resistance to the flow. The low resistance to the flow is desirable in that it reduces pumping requirements and the stress on the pipes.

Figure 9:
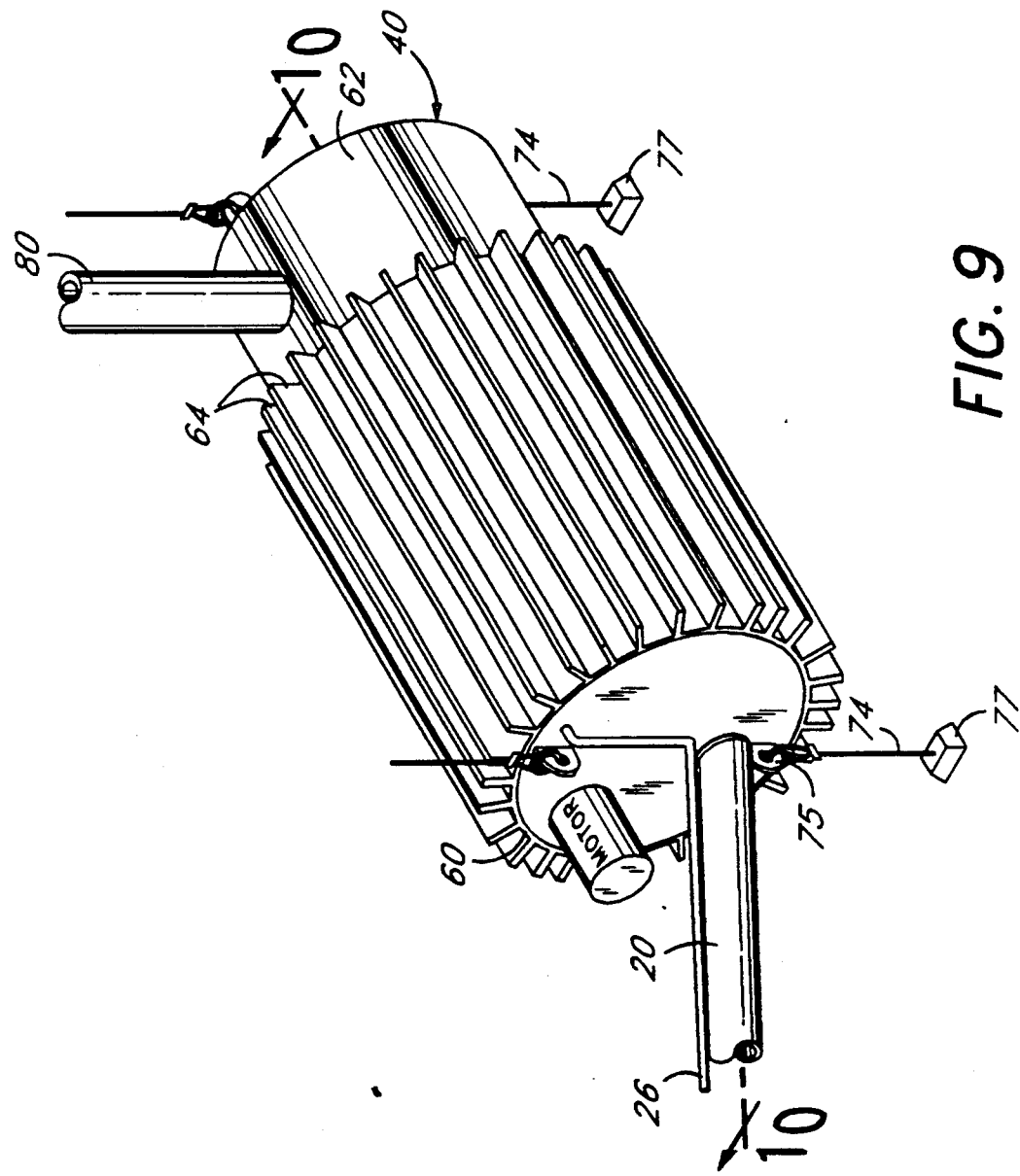
FIG. 9 is a perspective of a second embodiment of the mixing chamber.
Figure 10:
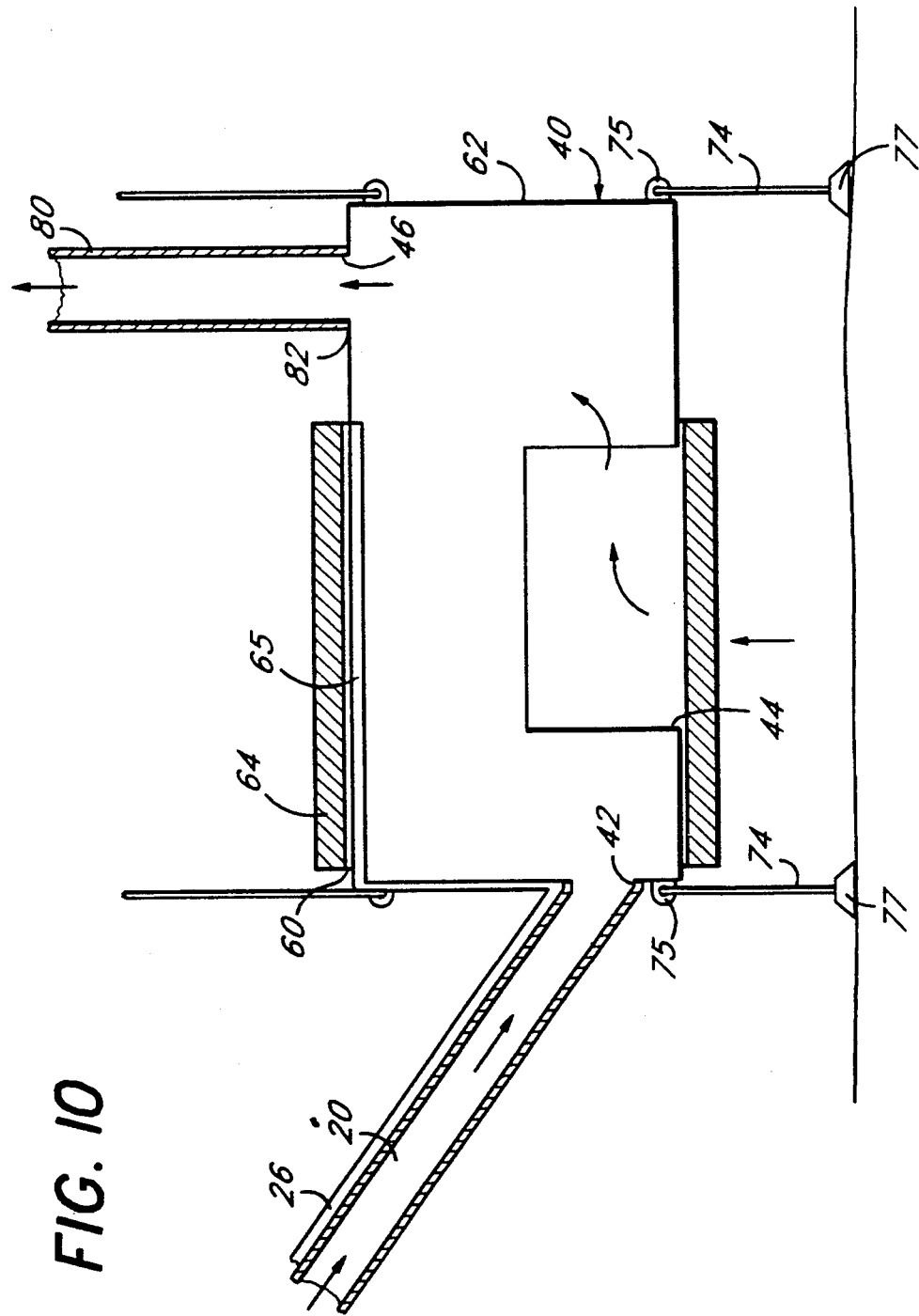
FIG. 10 is a cross-sectional view of the second embodiment of the mixing chamber taken along lines 10—10 of FIG. 9.

As shown in FIGS. 9 and 10, the down pipe 20 may include a relatively high-pressure, low-volume conduit 26 which provides a separate flow path parallel to the down pipe. The diameter of the low-volume conduit 26 provides a sufficient flow to ensure proper functioning of the mixing chamber 40, as discussed infra.

Figure 3:
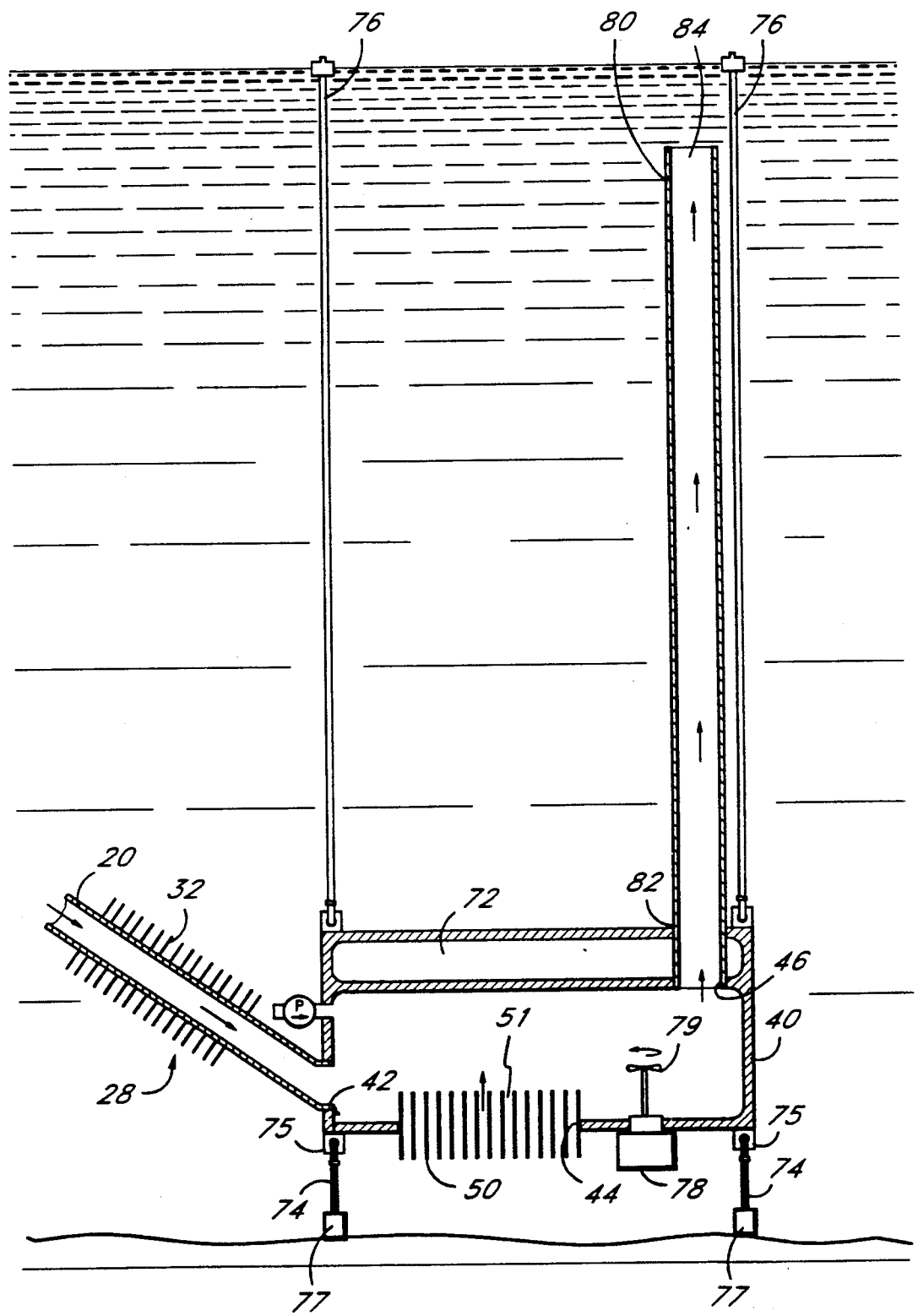
FIG. 3 is a cross-sectional view taken along lines 3—3 of FIG. 2 showing the mixing chamber.

Referring to FIG. 3 for applications in OTEC systems, the down pipe includes radiators or heat exchangers 28 along the length of the pipe. The heat exchangers 28 may include a plurality of fins or plates 32 which extend into the ambient sea, or cross channels through the down pipe (not shown) which thermally expose the interior of the down pipe to the ambient sea. As the input stream descends toward the predetermined depth, the heat exchangers 28 lower the temperature of the input stream to approach the temperature of the ambient sea. Preferably, the heat exchangers 28 provide that the temperature of the flow in the down pipe 20 is substantially equal to the temperature of the ambient sea as the flow enters the mixing chamber 40.

Figure 2:
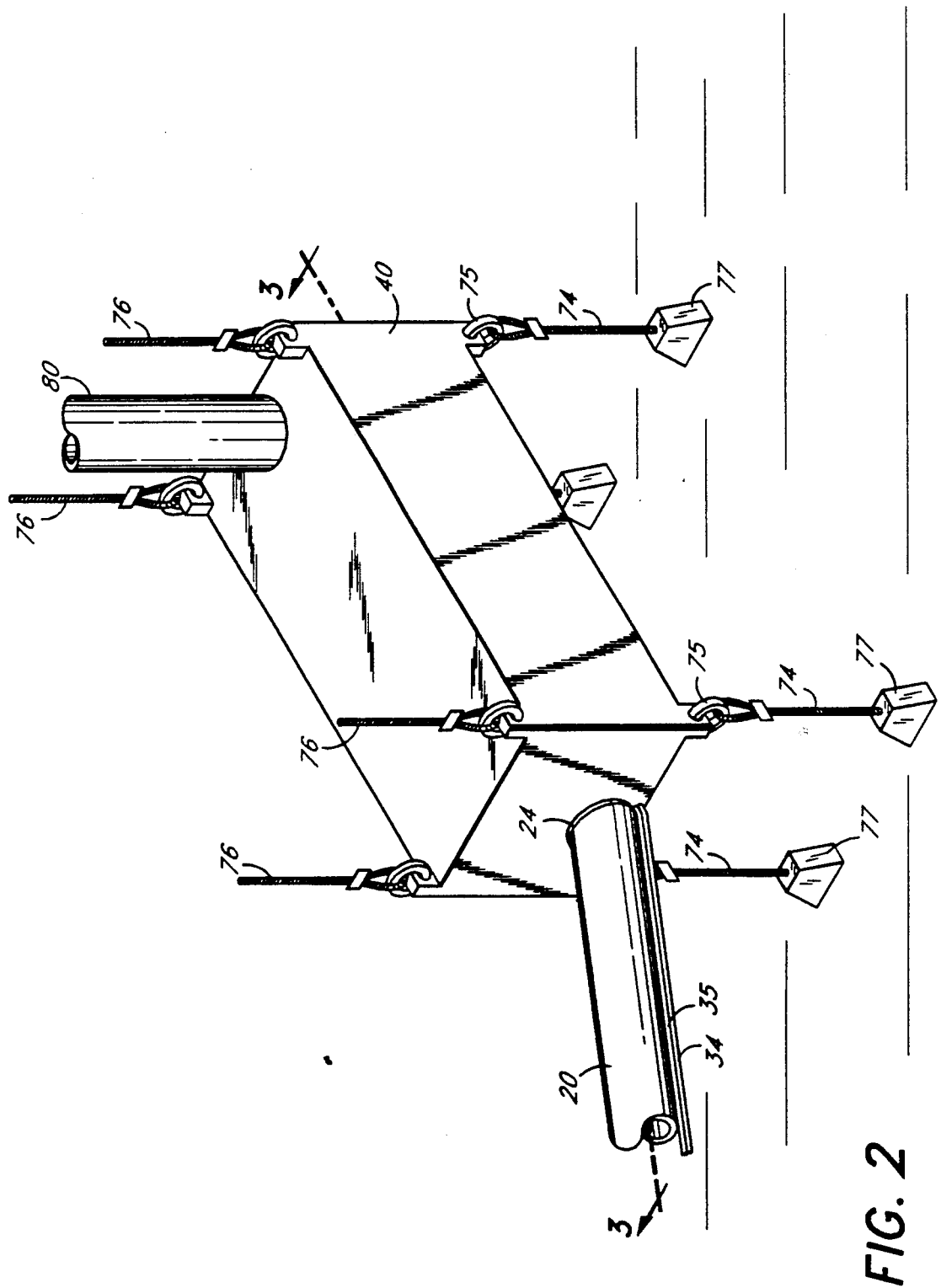
FIG. 2 is a perspective of the mixing chamber at the predetermined depth.

As shown in FIG. 2, power and communication lines 34, 35 extend from the surface to the mixing chamber 40 parallel to the down pipe 20. The power lines 34 are underwater cables as well-known in the art. The communication lines 35 provide for the transmission of signals between the surface and the mixing chamber 40 so that the system parameters such as flow rate, temperature, salinity, density, pressures and pressure differentials may be monitored.

Mixing Chamber

As shown in FIGS. 1 and 2, the mixing chamber 40 is disposed at the predetermined depth, and may be of a variety of configurations. Referring to FIGS. 2–8, and 10, each configuration of the mixing chamber 40 includes an inlet port 42, an influx port 44 and an outlet port 46 which are fluidly connected to the interior of the mixing chamber 40. Preferably, the inlet and influx ports 42, 44 are separated from the outlet port 46 so that as fluids pass from the inlet and influx ports 42, 44 to the outlet port 46, the fluids mix to form a substantially homogenous mixture. As stated supra, it is preferable that the up pipe 80 and down pipe 20 extend directly into the mixing chamber 40 so that the number of elbows in the system is minimized, thereby reducing the resistance to flow through the pipes and simplifying maintenance procedures.

Referring to FIGS. 1-8, the first embodiment of the mixing chamber 40 includes a substantially fluid-tight vessel enclosing a volume of space for the mixing of fluids. The first embodiment of the mixing chamber 40 has a substantially rectangular volume, wherein the inlet and outlet ports 42, 46 are separated from each other such that the influx port 44 is between the inlet and outlet ports 42, 46. Preferably the influx port 44 located in the bottom of the chamber 40 proximal to the inlet port 42. The influx port 44 of the first embodiment may be any of a variety of configurations.

Figure 4:
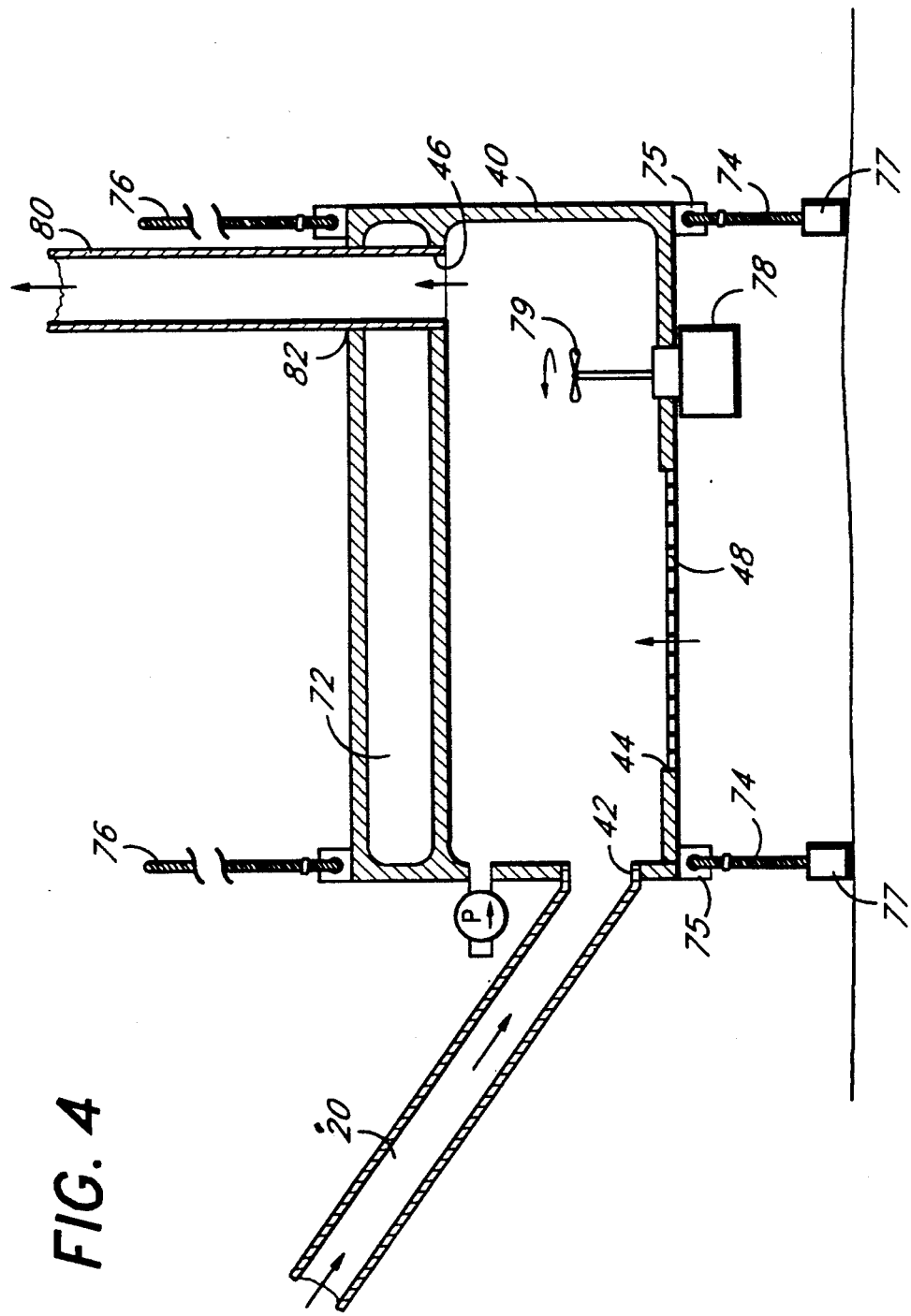
FIG. 4 is a cross-sectional view of an alternative configuration of the first embodiment of the mixing chamber.

As shown in FIG. 4, the first configuration includes a permeable membrane panel 48 in the influx port 44 of the mixing chamber 40. The membrane panel 48 permits monodirectional fluid flow from the exterior of the mixing chamber to the interior of the mixing chamber 40. Preferably, the panel 48 is located at the bottom of the vessel proximal to the connection of the down pipe 20 and the mixing chamber 40. Under preferred operating conditions, a pressure gradient across the membrane panel 48 provides the motive force for the monodirectional flow.

Figure 5:
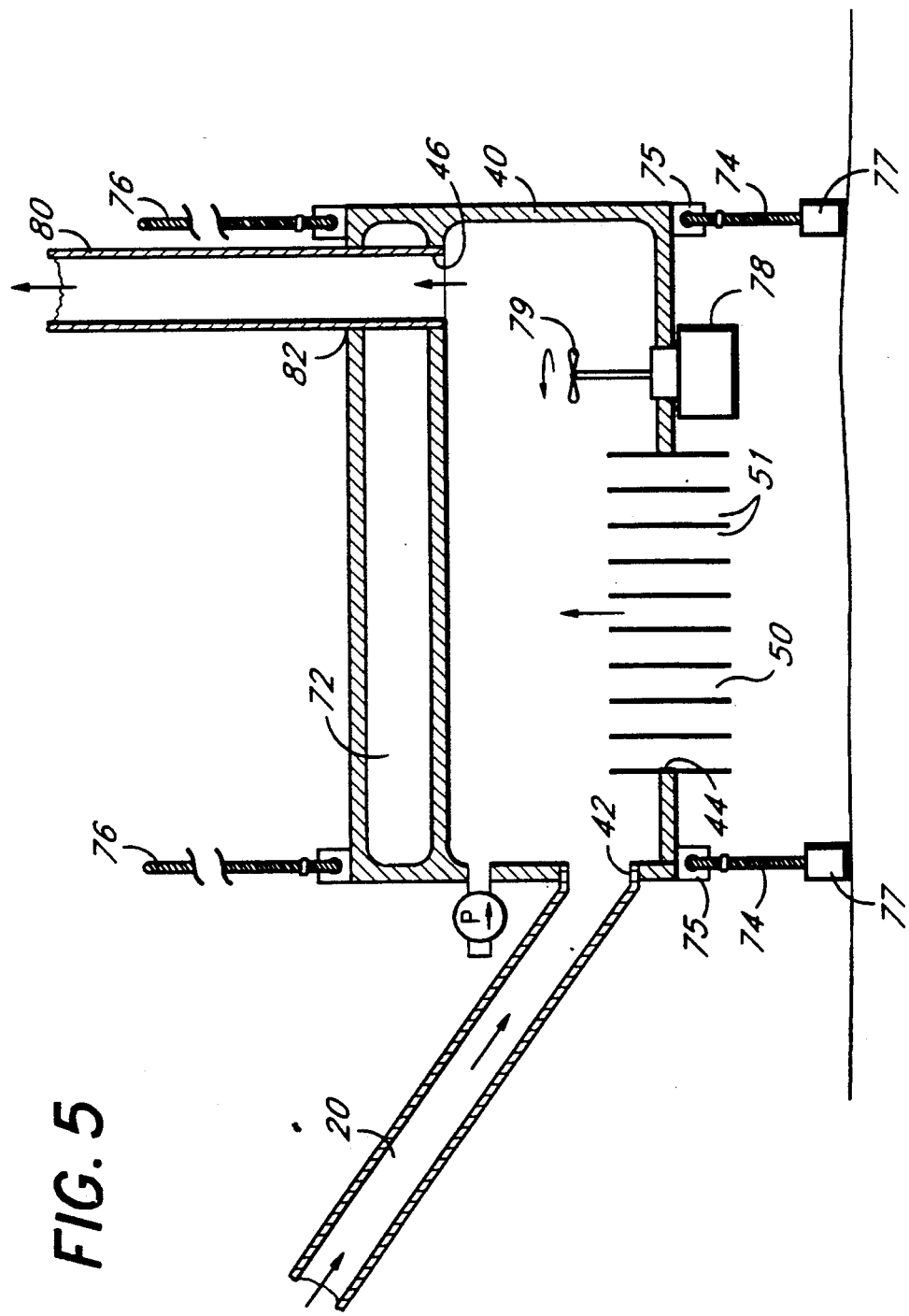
FIG. 5 is a cross-sectional view of an alternative configuration of the first embodiment of the mixing chamber.
Figure 6:
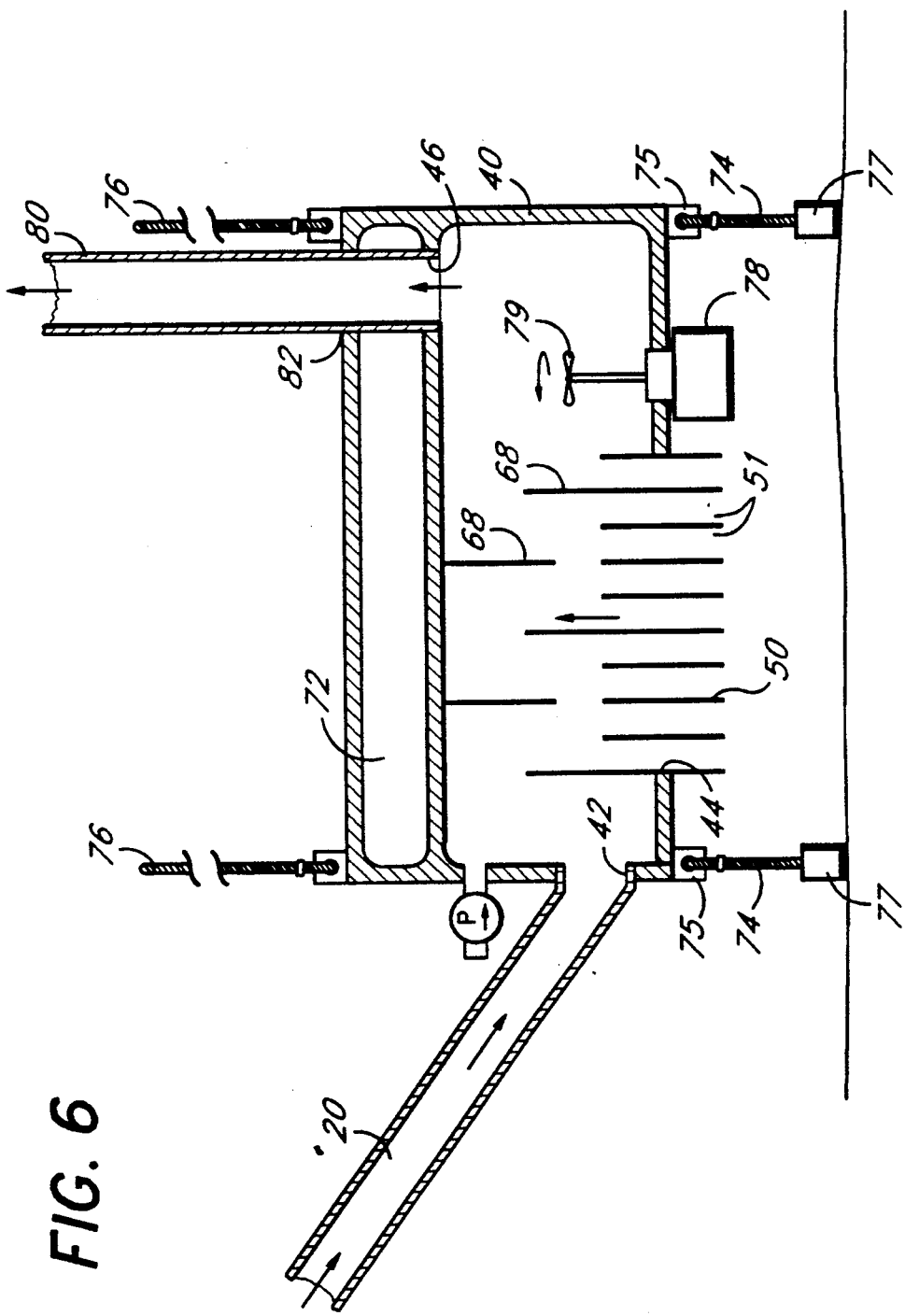
FIG. 6 is a cross-sectional view of an alternative configuration of the first embodiment of the mixing chamber.

Referring to FIGS. 3, 5 and 6, a second configuration of the influx port 44 of the first embodiment may include a plurality of parallelly-spaced vertical vanes 50. The vanes 50 are oriented perpendicular to the bottom wall of the vessel. Although the vanes 50 are shown extending perpendicular to the longitudinal axis of the chamber 40, the vanes may be disposed substantially parallel to the longitudinal axis. The vanes 50 may extend externally of the chamber 40, internally of the chamber, or both, as shown in FIGS. 3, 5 and 6. The vanes 50 are spaced so as to preclude passage of relatively large organic matter while permitting passage of the nutrients of the predetermined depth. Typically, the vanes 50 may be formed of non-reacting material, such as plastic or Lexan®, and separated by a sufficient distance so as to preclude passage of relatively large sea life in the mixing chamber, without introducing a substantial resistance to flow into the chamber. The vanes 50 may be separated from each other by an interspace 51 approximately equal to thickness of the Vanes 50. Alternatively, the interspacing 51 may be substantially less than the width of the individual vanes 50. Preferably, the fluid flow between the vanes 50 enters the mixing chamber 40 substantially perpendicular to the flow through the chamber.

Figure 7:
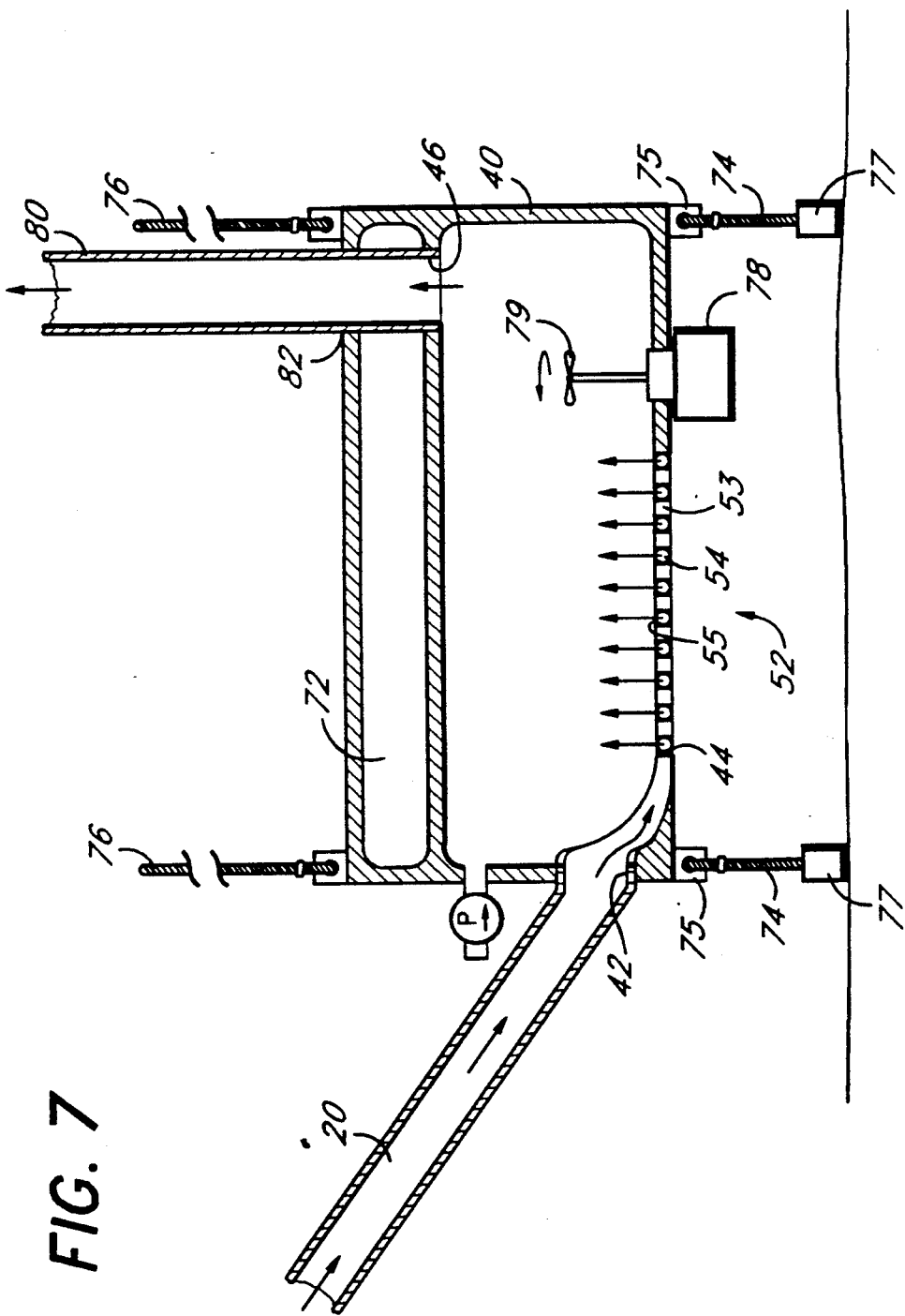
FIG. 7 is a cross-sectional view of an alternative configuration of the first embodiment of the mixing chamber.
Figure 8:
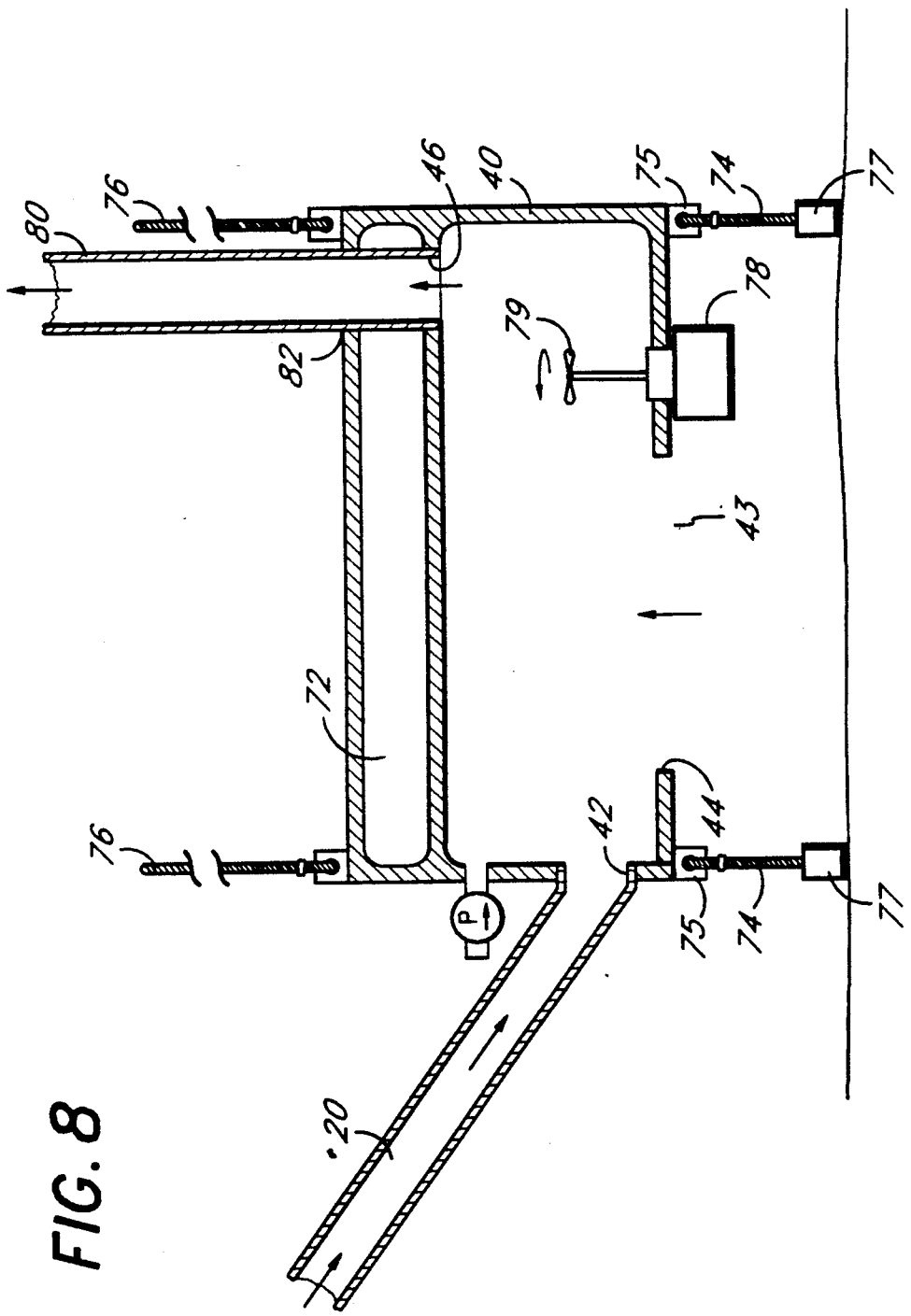
FIG. 8 is a cross-sectional view of an alternative configuration of the first embodiment of the mixing chamber.

As shown in FIG. 7, the influx port 44 may alternatively include a dispersion array 52. The dispersion array 52 accommodates the passage of the input stream and the ambient sea water into the mixing chamber 40. The down pipe 20 is fluidly connected to the dispersion array 52 which introduces the fresh water into the mixing chamber 40 at a plurality of locations. The dispersion array includes a bifurcated manifold 53 having a pair of parallel opposing arms fluidly connected to the down pipe 20. A plurality of channels 54 extend parallelly between the arms and are separated by a distance which permits the sea water to flow into the mixing chamber 40, while precluding foreign particulate matter from entering. Each channel 54 includes a plurality of apertures 55 which open into the interior of the mixing chamber 40. The channels 54 may be arranged either parallel or perpendicular to the longitudinal axis of the mixing chamber 40. Preferably, the channels 54 are spaced so as to achieve the same function as the vanes. That is, the interstitial spacing between the channels permits ambient sea water to enter the mixing chamber while precluding passage of matter which is undesirable in the upwelled mixture. The fresh water input stream is conducted through the down pipe 20, and the bifurcated manifold 53 to the individual channels 54, then through the apertures 55 and into the mixing chamber 40. As the input stream thereby enters the mixing chamber 40 over an area and the ambient sea water enters between the channels 54, the fluids form a substantially homogenous mixture upon entering the mixing chamber 40. Alternatively, as shown in FIG. 8, the influx port 44 may include an open aperture 43 having a sufficient cross-sectional area to permit passage of the desired amount of sea water into the mixing chamber 40.

As shown in FIG. 10, a second embodiment of the mixing chamber 40 includes an outer cylinder 60 and an inner drum 62. The down pipe 20 is fluidly connected to the inlet port 42 at one end of the drum 62 and the up pipe 80 is fluidly connected to the outlet port 46, such that the influx port 44 is intermediate of the inlet port 42 and the outlet port 46. The drum 62 is concentrically disposed within the cylinder 60 so that the cylinder may rotate relative to the drum about the concentric axis. Although the drum 62 and the cylinder 60 may be substantially coterminous, it is preferable that the drum extend beyond an end of the cylinder so that the up pipe 80 may extend vertically from the top of the drum without interfering with the rotation of the cylinder about the drum. The cylinder 60 and drum 62 are sized such that the outer diameter of the drum is proximate to the inner diameter of the cylinder. The cylinder 60 includes a plurality of closely spaced longitudinal louvers 64 extending the length of the cylinder. The louvers 64 may extend radially or, alternatively, be angled relative to a given radius. The angled louvers define angled passageways into the interior of the cylinder so as to provide a means for rotating the cylinder 60 relative to the drum 62. The cylinder 60 may also be rotated relative to the drum 62 by the high-pressure low-volume flow.

Referring to FIG. 10, the drum 62 includes a longitudinal groove 65 extending along the top of the drum. The groove 65 is fluidly connected to the high-pressure, low-volume conduit 26 and has a length substantially equal to the length of a louvre. The groove 65 has a width substantially equal to the distance separating adjoining louvers 64 on the cylinder 60. Rotation of the cylinder 60 relative to the drum 62 is caused by impinging a portion of the high-pressure, low-volume flow upon the louvers 64. As shown in FIG. 9, however, the mixing chamber 40 may also include a motor M for rotating the cylinder relative to the drum. The motor M may be selectively activated so as to ensure rotation of cylinder 60 relative to the drum 62.

Referring to FIG. 10, the influx port 44 of the second embodiment of the mixing chamber 40 is located at the bottom of the drum 62 and is exposed to the louvers 64. Fluid may pass from outside the drum to the interior of the drum through the influx port. That is, the flow path for the second embodiment of the mixing chamber 40 passes between the louvers of the cylinder 60, through the influx port 44 and into the drum 62.

Referring to FIGS. 3-8, the mixing chamber 40 may also include a pump P in addition to, or in place of, the above-referenced influx ports. The pump P is a submersible type pump for drawing sea water into the mixing chamber 40 at a predetermined rate. Power is supplied to the pump P through the power line 34. Depending upon the flow rate through the influx port 44, the pump P may be selectively employed to provide the desired flow rate of sea water into the mixing chamber 40. Alternatively, the pump P may be used in place of the influx port 44 and thereby provide for control of the amount of ambient sea water flowing into the mixing chamber 40.

As shown in FIG. 6, the mixing chamber 40 may also include baffles 68 between the inlet port 42 and the outlet port 46 so as to define a convoluted flow path therebetween. The convoluted flow path enhances mixing of the fresh water input stream and the sea water passing through the influx port 44.

Referring to FIGS. 3-8, the mixing chamber 40 may also include a flotation system for locating the mixing chamber 40 at a predetermined depth. The flotation system includes a buoyancy member 72, a plurality of mooring lines 74 and a plurality of retrieval lines 76. As shown in FIGS. 3-8, the buoyancy member 72 is disposed in the upper portion of the mixing chamber 40. The buoyancy member 72 is preferably styrofoam; however, it may comprise a plurality of individual air bags, or any other material capable of retaining a volume of gas. Preferably, the buoyancy member 72 retains a sufficient volume of air to provide a lifting force which tends to cause the mixing chamber to rise towards the surface. However, as the pressure of the ambient sea upon the buoyancy member 72 at the predetermined depth may produce excessive forces on the mixing chamber 40, the buoyancy member 72 may be reduced in size or omitted entirely.

The mooring lines 74 extend from couplings 75 on the mixing chamber 40 to anchors 77 fixed relative to the sea floor. As the mooring lines 74 retain the mixing chamber 40 relative to the sea floor against the lifting force of the buoyancy member 72, the mixing chamber 40 is retained at the predetermined depth in a predetermined orientation.

The retrieval lines 76 extend from the mixing chamber 40 to the surface to permit controlled raising of the mixing chamber for maintenance and repair.

Referring to FIGS. 3-8, each embodiment of the mixing chamber 40 may also include a mixer 78. The mixer 78 includes a blade or prop 79 rotatable within the mixing chamber 40. The mixer 78 is connected to the power line 34 to obtain the necessary motive force for the mixer. The mixer 78 provides for the circulation and agitation of fluids within the mixing chamber 40, rather than an increase in the fluid pressure within the mixing chamber. The mixer 78 thereby produces a substantially uniform, homogeneous mixture within the chamber 40.

Up Pipe

As shown in FIGS. 1 and 3, the up pipe 80 includes a secured end 82 and a discharge end 84. The secured end 82 is fluidly connected to the outlet port 46 of the mixing chamber 40 distal to the connection of the down pipe 20. Preferably, the secured end 82 of the up pipe 80 is substantially separated from the influx port 44, the inlet port 42 and the pump P if the pump is employed. As the up pipe 80 is distal to the down pipe 20 and the influx port 44, the fluids in the chamber 40 may reach a greater degree of homogeneity as the fluids pass through the mixing chamber than if the up pipe 80 were proximal to the influx or inlet ports 44, 42. The up pipe 80 extends from the mixing chamber 40 towards the surface to terminate at the discharge end 84. In a preferred embodiment, the cross-sectional area of the up pipe 80 is approximately three times greater than the area of the down pipe 20.

The discharge end 84 may extend to, or above the surface as in typical OTEC systems or, alternatively, may be disposed in the photic zone so as to bring nutrient-rich, deep-sea water to the photic zone.

Prior OTEC systems have required relatively high pressures to operate the cold water pipes thereby requiring that the pipes have relatively high-pressure tolerances. In order to satisfy these tolerances, the pipes were extremely expensive to construct. The operating conditions and environment of the cold water pipes often resulted in the cost of the cold water pipe representing approximately 50% of the cost of an OTEC system.

In contrast, the reduced operating pressures of the present invention provide for a simpler construction of the pipes 20, 80. Specifically, the up pipe 80 conducts a relative low-density fluid, which tends to automatically rise in response to the higher pressure ambient sea water; therefore, the up pipe 80 is not subjected to high operating pressures. Although the down pipe 20 experiences higher operating pressures than the up pipe 80, the size and flow rate of the down pipe may be selected so as to substantially reduce the operating pressure in the down pipe. Therefore, the up and down pipes 80, 20 may be constructed of relatively inexpensive and lightweight material, such as plastic, in contrast to the expensive heavy metal pipes of the prior art.

Initiation of Steady State Operation

During start-up conditions, or after extended periods in an inoperative state, the up pipe 80, down pipe 20 and mixing chamber 40 may be filled with ambient sea water. Therefore, as fresh water is initially conducted through the down pipe 20 to the mixing chamber 40, the hydrostatic head of the sea water in the up pipe 80 may direct all or a portion of the fresh water input stream through the influx port 44, to the ambient sea, in the direction opposite to the operating condition.

To bring the disclosed apparatus to a steady state operable configuration, the influx port 44 is initially closed and the fresh water is then conducted through the down pipe 20 so that fresh water displaces any salt water in the down pipe 20 and the mixing chamber 40. The fresh water also displaces at least a portion of the sea water in the up pipe 80, so as to reduce the average hydrostatic head of the fluid in the up pipe 80 to be less than the hydrostatic head of the ambient sea. The influx port 44 is then opened so as to permit ambient sea water to enter the mixing chamber 40, wherein the resulting mixture of fresh water and sea water passes through the up pipe 80 from the predetermined depth.

Method for Inducing Steady State Upwelling

Referring to the arrows in FIGS. 1 and 2 in steady state operation, the method includes conducting an input stream of relatively fresh-water through the down pipe 20 to the mixing chamber 40. Although the term "fresh-water" is used to describe the input stream, the stream may be from a river discharge, a mountain runoff, a treated sewage discharge, a melting iceberg, or even runoff from a city drainage system. As shown in FIG. 1, a pumping station 30 may be used to conduct the fresh-water input stream through the down pipe 20 to the mixing chamber 40.

The mixing chamber 40 is located at a predetermined depth, as dictated by the necessary salinity, temperature, nutrient content and density of the mixture to be upwelled. These parameters in turn depend upon the application of the upwelled mixture. For example, in the Hawaiian islands for OTEC applications, the predetermined depth is approximately 1000 meters wherein the ambient water temperature at 1,000 meters is approximately 35° F., with a salinity of approximately 34.6 parts per 1,000. The surface temperature is approximately 80° F., with a salinity of approximately 35.5 parts per thousand. The input stream has a salinity of approximately 0.3 parts per thousand and a temperature of approximately 65° F.

However, as the actual temperature and salinity of the ambient sea water will vary by season and geographic location, the relative purity of the fresh-water input stream and the depth of the mixing chamber must be determined on a site-by-site basis. It is, therefore, impossible to precisely define or quantify the salinity or degree of "freshness" of the fresh-water input stream. It is only necessary that the input stream have a lower salinity than the ambient sea water at the predetermined depth of the mixing chamber.

The fresh-water input stream is conducted through the down pipe 20 by application of a cap pressure at the inlet end 22 of the down pipe 20. As shown in FIG. 1, the cap pressure may be provided by a pumping station 30, as well known in the art, or a hydrostatic head pressure, resulting from a fluid reservoir at a higher elevation. Preferably, the down pipe 20 and up pipe 80 have a sufficiently large diameter so that the necessary pressure differential, over hydrostatic, to cause a flow through the pipe is negligible compared to the hydrostatic forces. It is only necessary that the cap pressure be sufficient to force the freshwater stream into the mixing chamber 40. This defines the lower limit of the cap pressure.

In the first embodiment of the mixing chamber, employing the permeable membrane 48 in the influx port 44, as the hydrostatic pressure of the ambient sea is greater than the pressure of the fresh-water input stream entering the chamber 40, the resulting pressure differential drives ambient sea water through the permeable membrane panel 48 into the chamber. The upper limit of the cap pressure is determined by the hydrostatic head of the sea at the depth of the mixing chamber 40. As the pressure of the freshwater input stream must be great enough to produce a flow into the mixing chamber 40, the pressure of the fresh-water input stream as it enters the mixing chamber 40 is preferably less than the hydrostatic head of the sea at the depth of the mixing chamber 40 so that ambient sea water is forced by the resulting pressure differential through the influx port 44.

Similarly, in the configurations of the mixing chamber 40 employing the vanes 50 or aperture 43, the hydrostatic head of the ambient sea being greater than the pressure of the input stream entering the mixing chamber forces ambient sea water into the mixing chamber 40 through the influx port 44. In the embodiment of the mixing chamber employing the inner drum 62 and rotating cylinder 60, as the fresh-water input stream enters the drum 62, the fluid pressure is less than the hydrostatic head of the sea. The higher pressure of the ambient sea causes sea water to be forced through the cylinder 60 and into the drum 62. As the sea water passes through the louvers 64 of the cylinder 60, the flow over the louvers causes the cylinder to rotate. The pressure fluctuations across the louvers 64 substantially cleans the louvers 64 of potentially clogging particulate matter, such as plant or animal matter, thereby ensuring an unimpeded influx of sea water into the mixing chamber.

The cylinder 60 may also be rotated relative to the drum 62 by the impinging the high-pressure low-volume flow upon the louvers 64. The longitudinal groove 65 extending along the top of the drum permits passage of the relatively high-pressure, low-volume fresh-water stream. As the groove 65 is proximal to the rotating louvers 64, the fresh-water flow through the groove 65 effectively "blows" any material from between the louvers, thereby providing a further mechanism for cleaning the louvers. Alternatively, as shown in FIG. 9, a submersible motor may be used for rotating the cylinder 60 relative to the drum 62.

In addition, as the low-volume stream is relatively fresh water, the exposure of salt water organisms to the low-volume stream results in a fresh water "shock" to salt water organisms. The fresh-water shock inhibits growth of salt water organisms on the louvers 64. Similarly, the salt water entering the drum 62 exposes any fresh-water growth in the drum to a relatively high salt content, thereby inducing a salt water "shock." The salt water shock prevents accumulation of fresh water organisms within the drum 62. In addition, as the mixing chamber 40 is typically disposed in the aphotic zone, there is no growth of photosynthetic plants which could clog the louvers 64. The sea water thereby passes through the cylinder 60 to the influx port 44. As discussed, the pressure differential between the input stream entering the drum 62 and the ambient sea causes the sea water to enter the drum.

However, if the cap pressure is so great that the pressure differential across the influx port 44 is insufficient to generate a flow of sea water into the chamber 40, the pump P may be used to draw sea water into the mixing chamber 40.

As the sea water passes into the mixing chamber 40, the sea water mixes with the input stream. The fresh-water input stream of the down pipe 20 mixes with the nutrient-rich sea water, thereby diluting the salt concentration of the sea water. If necessary, the mixer 78 provides sufficient agitation of the fluids within the mixing chamber 40 so as to provide a substantially homogeneous mixture.

In a preferred embodiment, approximately one part of the fresh-water input stream mixes with two parts of ambient sea water to form the mixture. The mixture has an average density which is greater than the input stream, but less than the ambient sea water at the predetermined depth of the mixing chamber. In the absence of heat exchangers 28 on the down pipe 20, the input of the freshwater stream and the sea water entering the mixing chamber 40 produce a mixture having a temperature higher than the ambient sea water by approximately one-third the difference between the sea water and the fresh water stream temperature. That is, if the ambient sea temperature at the predetermined depth is approximately 35° F. and the input stream temperature is approximately 65° F., the mixture temperature is approximately 45° F. The mixture thereby has a lower density than the sea water outside the mixing chamber 40, but a higher density than the input stream.

The density of the mixture is predominantly determined by the relative salinity and temperature of the ambient sea and the fresh water input. In OTEC systems, the temperature difference between the input stream and the ambient sea is minimized. If the input stream is exposed to heat exchangers 28 on the down pipe 20, as in the application of the disclosed method to OTEC systems, the heat exchangers provide that, as the input stream enters the mixing chamber 40, the temperature of the input stream is substantially the same as the temperature of the ambient sea. The temperature of the mixture is, therefore, substantially that of the ambient sea and the mixture may then be efficiently used in power generation. The lower salinity of the mixture relative to the ambient sea water substantially determines the difference in densities in providing the upwelled mixture with a lower density than the ambient sea water.

In either application, the mixture in the up pipe 80 has a greater density than the fresh-water of the down pipe 20. Therefore, the cap pressure must be at least as great or greater than the difference between the hydrostatic pressure of the up pipe 80 less the hydrostatic pressure of the down pipe 20. The mixture then flows up the up pipe 80, carrying nutrient-rich water from the depth of the mixing chamber to a lesser depth. The mixture may then be diverted at a given depth to provide nutrients for a harvestable feed stock. Alternatively, the mixture may be conducted to the surface or above the surface for applications including OTEC systems.

Referring to FIG. 1, let "$P_c$" be the cap pressure of the fresh-water supply at sea level. As previously stated, the cap pressure may be obtained by mechanical pumps or a pressure head resulting from an elevated fluid reservoir. Let "$P_b$" be the pressure of the mixing chamber. As the fresh-water input stream enters the mixing chamber at the terminal end of the down pipe, $P_b$ equals the hydrostatic pressure due to the fluid in the down pipe ($H_d$) plus the cap pressure ($P_c$), less the pressure drop required to cause the downward flow ($P_d$); that is:

$$P_b = P_c + H_d - P_d \quad (1)$$

At the inlet end of the up pipe, as the flow exits the mixing chamber, the pressure in the mixing chamber ($P_b$) equals the hydrostatic pressure of the column of fluid in the up pipe ($H_u$) plus the pressure necessary to cause a fluid flow up the up pipe ($P_u$); that is:

$$P_b = H_u + P_u \quad (2)$$

The following assumptions are made in the derivation of the formulas governing the operating conditions of the system:

1. The average density of the ambient sea water at the depth of the mixing chamber is greater than the average density of the mixture in the up pipe; therefore, the hydrostatic head of the sea water ($H_s$) is greater than the hydrostatic head of the mixture within the up pipe ($H_u$), that is:

$$H_s > H_u \quad (3)$$

2. The average density of the mixture in the up pipe is greater than the average density of the fresh water in the down pipe; therefore, the hydrostatic pressure of the mixture in the up pipe ($H_u$) is greater than the hydrostatic pressure of the fluid in the down pipe ($H_d$), that is:

$$H_u > H_d \quad (4)$$

3. The hydrostatic pressure of the ambient sea ($H_s$) at the depth of the mixing chamber is greater than the pressure in the mixing chamber ($P_b$); that is:

$$H_s > P_b \quad (5)$$

From equations (1) and (2), equating $P_b$:

$$P_c + H_d - P_d = H_u + P_u; \text{ or}$$

$$P_c = (H_u - H_d) + P_u + P_d \quad (6)$$

$P_u$ and $P_d$ can be made arbitrarily small by increasing the diameter of the up and down pipes, decreasing the flow rate or any combination thereof. Therefore, the minimum cap pressure ($P_c$) is the hydrostatic pressure of the up pipe ($H_u$) less the hydrostatic pressure of the down pipe ($H_d$); that is:

$$P_c (\text{min.}) = H_u - H_d \quad (7)$$

Relating the cap pressure ($P_c$) to the hydrostatic pressure of the ambient sea, $H_s$, from equations (1) and (5);

$$P_c + H_d - P_d < H_s, \text{ or}$$

$$P_c < H_s - H_d + P_d \quad (8)$$

As $P_d$ tends to 0, then $$P_c (\text{min.}) < H_s - H_d \quad (9)$$

Therefore, the required cap pressure, with sufficiently large up and down pipes, or sufficiently small flow rates, or both, must be less than the hydrostatic head of the ambient sea at the predetermined depth minus the hydrostatic head of the down pipe.

In some applications of the present invention, it is desirable that the upwelled mixture exit above the surface of the ocean. The attainable height above the surface that the upwelled mixture may reach depends upon the average specific weight of the upwelled mixture, the ambient sea water, and the predetermined depth.

The first derivation of the attainable height above the surface assumes there is no pressure differential between the ambient sea and the mixing chamber at the predetermined depth. The presence of a pressure differential will then be accounted for in the subsequent equation.

Upon no pressure differential at the predetermined depth, the average specific weight of an ambient sea column is equal to the average specific weight of the mixture column in the up pipe; that is:

$$\gamma_s h_s = \gamma_u h_u \quad (1)$$

where $\gamma_s$ is the average specific weight of the ambient sea column and $h_s$ is the height of the sea column (the predetermined depth); and $\gamma_u$ is the average specific weight of the mixture in the up pipe and $h_u$ is the height of the mixture in the up pipe.

However, as $\gamma_u$ is less than $\gamma_s$, $h_u$ must be greater than $h_s$. The height above the sea which the upwelling mixture will reach may be designated as $\Delta_h$.

Such that $$\Delta h = h_u - h_s \quad (2)$$

and $$\Delta \gamma = \gamma_s - \gamma_u \quad (3)$$

Insertion of equations (2) and (3) into (1) provides that the height of the upwelling above the sea level is proportional to the relative specific weights of the columns; that is:

$$\Delta h = h_s (\Delta\gamma/\gamma_u) \qquad (4)$$

Equation (4) represents the height of the upwelling mixture above the sea level $\Delta_h$, necessary to equalize the pressures at the mixing chamber.

However, upon a pressure differential in the mixing chamber, the height of the upwelling above the sea level increases such that:

$$\Delta h \leq h_s (\Delta\gamma/\gamma_s) \qquad (5)$$

Therefore, according to equation (5), the height of the upwelling above sea level may be from zero to a height equal to the predetermined depth of the mixing chamber times the ratio of the difference in average specific weights of the sea and the upwelled mixture to the average specific weight of the sea column.

Experimental Data

The following data was obtained during initial testing of a prototype of the first embodiment of the mixing chamber. From this data, it appears that excessive pressure in the fresh water input stream results in the mixing chamber effectively becoming a continuation of the down pipe, and thereby precluding an influx of sea water through the influx port. Also, as the diameter of the up pipe was increased, the salinity of the upwelled mixture for a given input stream flow rate and influx port area increased.

Experimental Test Results of the Second Embodiment of the Mixing Chamber

Volume of mixing chamber: 703 cubic inches
Influx port configuration: vanes parallel to the longitudinal axis of the mixing chamber
Depth of test site: approximately 11–15 inches
Salinity (NaCl) of ambient sea: 31 parts per thousand
Salinity (NaCl) of fresh water input: 0.4 parts per thousand
Temperature of ambient sea/fresh water: approximately 55° F.

| Run Number | Data: | | | |
|---|---|---|---|---|
| | Fresh Water Flow Rate (Gal./Min.) | Influx Port Effective Area (in²) | Up pipe Cross-Sectional Area (in²) | Salinity of Mixture (Parts/1000) |
| 1 | .44 | 3.75 | .60 | 24.0 |
| 1(a) | .44 | 3.75 | .60 | 26.0 |
| 2 | .88 | 3.75 | .60 | 5.0 |
| 3 | .88 | 7.50 | .60 | 2.0 |
| 3(a) | .88 | 7.50 | .60 | 2.0 |
| 4 | .66 | 7.50 | .60 | 14.0 |
| 5 | .44 | 7.50 | .60 | 20.0 |
| 5(a) | .44 | 7.50 | .60 | 20.0 |
| 6 | .44 | 7.50 | 1.23 | 28.0 |
| 6(a) | .44 | 7.50 | 1.23 | 26.0 |
| 7 | .44 | 14.25 | 1.23 | 28.0 |
| 7(a) | .44 | 14.25 | 1.23 | 26.5 |
| 7(b) | .44 | 14.25 | 1.23 | 26.0 |
| 7(c) | .44 | 14.25 | 1.23 | 26.8 |
| 8 | .44 | 14.25 | .60 | 25.0 |
| 8(a) | .44 | 14.25 | .60 | 24.0 |
| 8(b) | .44 | 14.25 | .60 | 21.0 |
| 8(c) | .44 | 14.25 | .60 | 22.5 |
| 9 | .44 | 14.25 | .44 | 20.0 |
| 9(a) | .44 | 14.25 | .44 | 19.0 |

Figure 11:
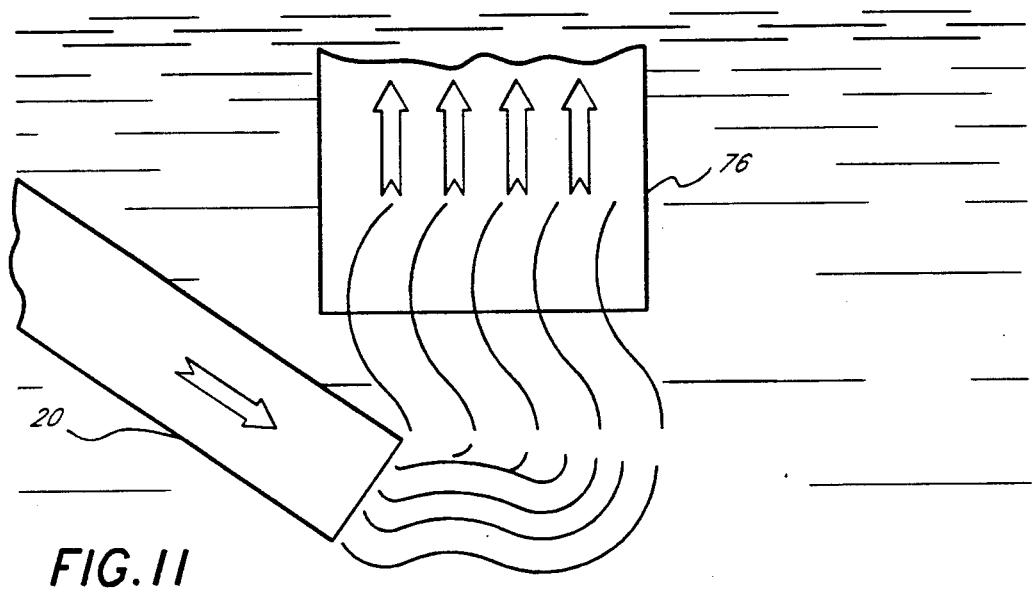
FIG. 11 is a schematic presentation showing the lower end of an up pipe positioned in the path of the lower end of a down pipe so that the output from the down pipe flows upwardly into the up pipe together with adjacent ocean water.
Figure 12:
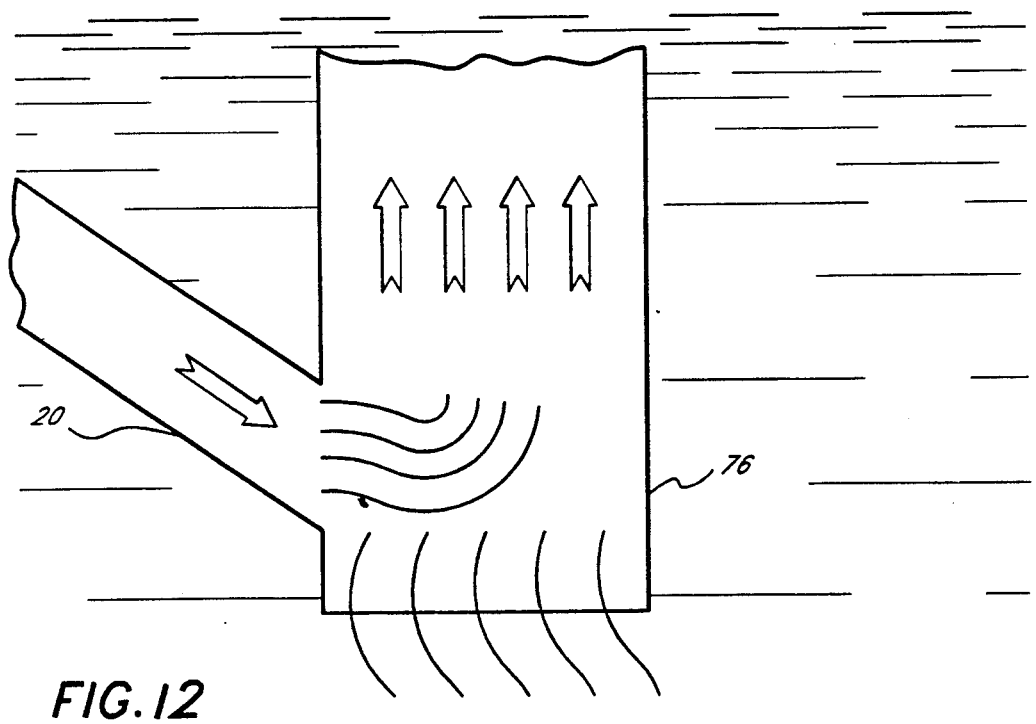
FIG. 12 is similar to FIG. 11, but the end of the down pipe physically intersects the up pipe.

From the foregoing, it may be recognized that in the simplest form of the invention, a mixing chamber formed by a specific structure is not actually needed if the down pipe and the up pipe are properly positioned and dimensioned. For example, referring to FIG. 11, there is shown the lower end of a down pipe 20 positioned slightly below but somewhat aligned with the lower end of an up pipe. As may be seen, the up pipe 26 has a larger diameter than the down pipe. The lighter density fluid stream emanating from the down pipe naturally flows upwardly through the up pipe, and in the process mixes with and draws with it surrounding ocean water so that the desired mixed stream is obtained without having a separate mixing chamber. Of course, the end of the up pipe may be thought of as a mixing chamber. FIG. 12 shows the lower end of the down pipe connected to the side of the up pipe 76 so that the output from the down pipe opens directly into the large diameter up pipe.

Although the present invention has been described in terms of particular embodiments, it is not limited to these embodiments. Alternative embodiments and modifications which would still be encompassed by the invention can be made by those skilled in the art, particularly in light of the foregoing teachings. Alternative embodiments, modifications or equivalents may be included within the spirit and scope of this invention, as defined by the claims.

What is claimed is:

1. A method for upwelling sea water from a predetermined depth, comprising:
    (a) conducting a stream of relatively fresh water from a source on land to the predetermined depth through a down pipe connected to said source, such that the salinity of the relatively fresh water stream is substantially less than the salinity of the sea water at the predetermined depth;
    (b) mixing the relatively fresh water stream with sea water from the predetermined depth to form a mixture; and
    (c) conducting the mixture through an up pipe upward to a depth less that the predetermined depth, the inlet end of said up pipe being in the path of the water stream out of the lower end of said down pipe while the upper end of the down pipe is remote from the up pipe, said down pipe having an open lower end which is dimensioned so as to minimize resistance to flow through the down pipe and out its lower end.

2. The method for upwelling sea water of claim 1 wherein the step of conducting the mixture upwards includes conducting the mixture to at least substantially the surface of the sea.

3. A method for upwelling sea water from a predetermined depth, comprising:
    (a) conducting a stream of relatively fresh water from a source on land to the predetermined depth through a down pipe connected to said source, so that the pressure of the relatively fresh water stream at the predetermined depth is less than the hydrostatic head of the surrounding ocean at the predetermined depth;

(b) mixing the relatively fresh water stream with sea water at the predetermined depth to form a mixture; and (c) conducting the mixture upward through an up pipe to a depth less than the predetermined depth, the inlet end of said up pipe being in the path of the water stream out of the lower end of said down pipe while the upper end of the up pipe is remote from the down pipe, said down pipe having an open lower end which is dimensioned so as to minimize resistance to flow through the down pipe and out its lower end.

4. The method for upwelling sea water of claim 3 wherein the step of conducting the mixture upward includes conducting the mixture to at least substantially the surface of the sea.

5. A method for upwelling sea water from a predetermined depth, comprising:

(a) conducting a confined downward stream of relatively fresh water from a source on land to the predetermined depth through a down pipe connected to said source;

(b) controlling the flow rate of the downward stream so that the pressure of the downward stream at the predetermined depth is less than the hydrostatic pressure of the sea at the predetermined depth;

(c) confining the outflow of the downward stream at the predetermined depth to a region in which a stream of sea water flows as a result of the pressure of the downward stream being less than the hydrostatic head of the sea in the region;

(d) combining the stream of water with the downward stream to form a mixture of sea water and relatively fresh water; and (e) conducting the mixture above the predetermined depth in a confined stream through an up pipe, said down pipe having an open lower end which is constructed to minimize flow resistance and is located close to said region while the upper end of said up pipe is remote from said down pipe.

6. The method for upwelling sea water of claim 5 wherein the step of conducting the mixture includes conducting the mixture to at least substantially the surface of the sea.

7. A system for inducing artificial oceanographic upwelling from a predetermined depth, comprising:

(a) a mixing chamber submerged at the predetermined depth, the mixing chamber including an influx port, an inlet port and an outlet port for providing a mixture of fluids;

(b) a down pipe fluidly connected to the inlet port and extending substantially to the surface of the ocean for conducting a relatively fresh water stream to the mixing chamber; and (c) an up pipe fluidly connected to the outlet port of the mixing chamber and extending towards the surface of the ocean to terminate at a discharge end so as to conduct the mixture from the mixing chamber towards the surface.

8. The system of claim 7 wherein the influx port includes a permeable membrane panel for providing substantially monodirectional fluid flow into the mixing chamber.

9. The system of claim 7 wherein the influx port includes a dispersion array fluidly connected to the down pipe for introducing the relatively fresh water stream into the mixing chamber.

10. The system of claim 7 wherein the influx port includes a plurality of parallel vanes separated by an interspace such that fluid may pass through the interspace into the mixing chamber.

11. The system of claim 7 further comprising a pump fluidly connected to the mixing chamber for selectively pumping sea water into the mixing chamber.

12. The system of claim 7 further comprising a mixer in the mixing chamber for agitating the fluids in the mixing chamber so as to produce a substantially homogeneous mixture.

13. The system of claim 7 wherein the mixing chamber includes an inner drum concentrically disposed relative to an outer cylinder such that the cylinder may rotate relative to the drum, and the down pipe and the up pipe are fluidly connected to the drum, and the drum includes the influx port.

14. A system for inducing artificial oceanographic upwelling from a predetermined depth comprising:

a down pipe having one end connected to a land source of water and having an output end in the ocean and said depth to transmit a stream of said water into the ocean, said down pipe being constructed to produce a minimum of flow resistance; and an up pipe in the ocean extending generally upwardly from a lower end at said predetermined depth to an upper end located in the photic zone of the ocean, said up pipe having a cross-sectional area which is larger than the cross-sectional area of the down pipe lower end, and said up pipe being located with respect to said down pipe in position to receive the stream of water emanating from the down pipe together with surround nutrient-rich ocean water which mixes with said stream, such mixture being conducted upwardly though said up pipe, the upper end of said up pipe being positioned remote from said down pipe.

* * * * *